United States Patent
Palanduz et al.

(10) Patent No.: US 6,795,296 B1
(45) Date of Patent: Sep. 21, 2004

(54) CAPACITOR DEVICE AND METHOD

(76) Inventors: Cengiz A. Palanduz, 281 W. Roadrunner Dr., Chandler, AZ (US) 85248; Victor Prokofiev, 3017 W. Glenhaven Dr., Phoenix, AZ (US) 85045

( * ) Notice: Subject to any disclaimer, the term of this patent is extended or adjusted under 35 U.S.C. 154(b) by 0 days.

(21) Appl. No.: 10/677,083

(22) Filed: Sep. 30, 2003

(51) Int. Cl.[7] ............................................. H01G 4/06
(52) U.S. Cl. ...................................... 361/311; 29/25.41
(58) Field of Search ..................... 361/311–313, 321.2, 361/321.3, 321.4; 29/25.41

(56) References Cited

U.S. PATENT DOCUMENTS 6,043,973 A * 3/2000 Nagashima et al. ........ 361/305
6,052,272 A * 4/2000 Kuroda et al. .............. 361/303
6,072,688 A * 6/2000 Hennings et al. ........... 361/311

\* cited by examiner

Primary Examiner—Anthony Dinkins

(57) ABSTRACT

A method for making, and a dielectric material is provided. A capacitor is provided that includes a lossy dielectric layer that is also not leaky. The lossy behavior dampens unwanted oscillations in power supplies or other electrical systems. A capacitor is further provided is tunable for an amount of lossy behavior over a broad range. A core dopant concentration can be varied, and a doped core grain fraction can be varied to control the extent of a desired lossy property in a capacitor. Dielectric materials having grains with doped shells reduce leakiness. Additionally in selected embodiments, undoped core grains mixed with doped core grains reduce leakiness.

27 Claims, 6 Drawing Sheets

CAPACITOR DEVICE AND METHOD

TECHNICAL FIELD

The present invention relates generally to capacitors, and more specifically to capacitors whose dielectrics are made of ceramic powder.

BACKGROUND

Power oscillations in DC power networks such as resonance oscillations cause problems when the power is being supplied to devices such as integrated circuits (ICs). Oscillations can interfere with providing and sensing signals such as in input/output operations in a personal computer. Without a solid baseline signal to compare to, for example, the signal to noise ratio of devices is compromised by oscillations.

More fundamentally, electrical components such as capacitors have a number of performance variables that result from control of manufacturing processes. For example, a dielectric constant in a ceramic capacitor is determined by manufacturing processes such as choice of dielectric materials, sintering temperature, sintering atmosphere, etc. The dielectric constant determined by these manufacturing processes affects a performance variable of the capacitor, such as capacitance.

In designing a circuit or other electrical device, it is desirable to know all of the relevant performance variables that will be present in a manufactured capacitor due to manufacturing process methods. It is further desirable to control selected performance variables of interest to achieve a desired capacitor performance.

What is needed is a device and method that reduces oscillations in electrical transmissions. What is also needed is a capacitor and method of manufacturing a capacitor that exhibits desired performance characteristics.

DETAILED DESCRIPTION

Figure 1:
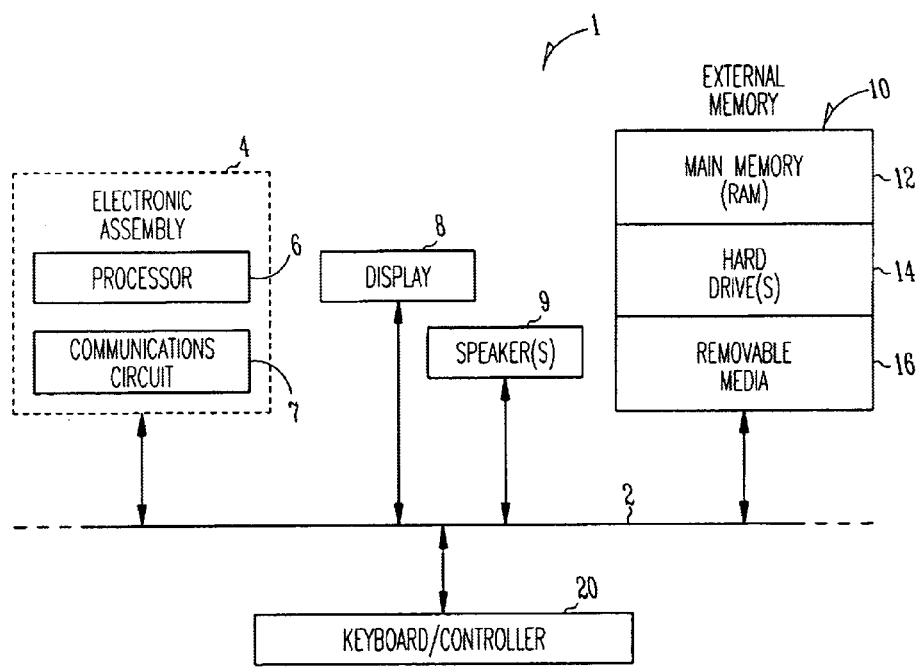
FIG. 1 illustrates an information handling device according to one embodiment of the invention.

In the following detailed description of the invention reference is made to the accompanying drawings which form a part hereof, and in which are shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized, and structural, logical, and electrical changes may be made, without departing from the scope of the present invention. The following detailed description is, therefore, not to be taken in a limiting sense, and the scope of the invention should be determined with reference to the appended claims, along with the full scope of equivalents to which such claims are entitled.

An example of an information handling system using processor chips memory devices is included to show an example of a higher level device application for the present invention. In one embodiment, a capacitor according to one embodiment of the invention is included in an information handling system as described below.

FIG. 1 is a block diagram of an information handling system 1 incorporating at least one capacitor in accordance with at least one embodiment of the invention. Information handling system 1 is merely one example of an electronic system in which the present invention can be used. In this example, information handling system 1 comprises a data processing system that includes a system bus 2 to couple the various components of the system. System bus 2 provides communications links among the various components of the information handling system 1 and can be implemented as a single bus, as a combination of busses, or in any other suitable manner.

Electronic assembly 4 is coupled to system bus 2. Electronic assembly 4 can include any circuit or combination of circuits. In one embodiment, electronic assembly 4 includes a processor 6 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit.

Other types of circuits that can be included in electronic assembly 4 are a custom circuit, an application-specific integrated circuit (ASIC), or the like, such as, for example, one or more circuits (such as a communications circuit 7) for use in wireless devices like cellular telephones, pagers, portable computers, two-way radios, and similar electronic systems. The IC can perform any other type of function.

Information handling system 1 can also include an external memory 10, which in turn can include one or more memory elements suitable to the particular application, such as a main memory 12 in the form of random access memory (RAM), one or more hard drives 14, and/or one or more drives that handle removable media 16 such as floppy diskettes, compact disks (CD), digital video disk (DVD), and the like. Examples of main memory 12 include dynamic random access memory (DRAM), synchronous dynamic random access memory (SDRAM), double data rate synchronous dynamic random access memory (DDR SDRAM), rambus dynamic random access memory (RDRAM), flash memory, static random access memory (SRAM), etc.

Information handling system 1 can also include a display device 8, one or more speakers 9, and a keyboard and/or controller 20, which can include a mouse, trackball, game controller, voice-recognition device, or any other device that permits a system user to input information into and receive information from the information handling system 1.

Figure 2:
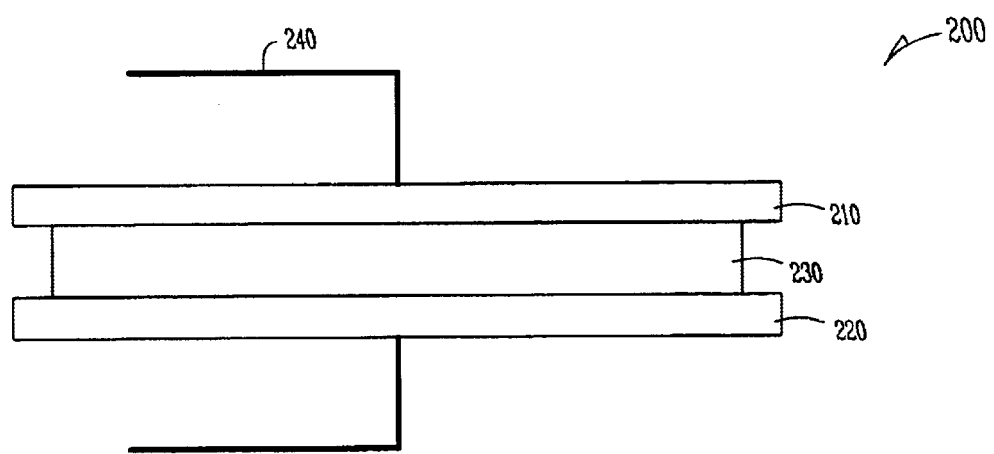
FIG. 2 is a schematic view of a capacitor assembly according to one embodiment of the invention.

FIG. 2 shows a capacitor 200. A first plate 210 is shown substantially opposite a second plate 220, with a dielectric layer 230 between the first plate 210 and the second plate 220. Connecting structures 240 are shown that are adapted to couple the capacitor 200 to other circuitry in an integrated circuit. FIG. 2 is intended as a schematic type figure.

The configuration shown is not necessarily the configuration of a production capacitor. For example, plate geometries other than planar are possible. While only a first plate 210 and a second plate 220 are shown in FIG. 2, other embodiments include additional plates in a stacked configuration to form a multi-layer ceramic capacitor (MLCC). Multiple layers increase an effective plate area which increases capacitance. In one embodiment, the plates include a conducting material. In one embodiment, a conducting material includes nickel metal. One of ordinary skill in the art, having the benefit of the present disclosure will recognize that other metals and other conducting materials are also possible within the scope of the invention. Connecting structures 240 are shown coupled to the centers of their respective plates, however the invention is not so limited. For example, connecting structures 240 can be coupled to their respective plates on end portions of the plates.

In one embodiment, the dielectric layer 230 includes a ceramic material, although other materials exhibiting dielectric properties are also acceptable. In one embodiment, a ceramic material is formed using a number of ceramic grains assembled together to form a layer. Grains such as ceramic grains are capable of a variety of electrical and physical properties, depending on manufacturing processes as will be discussed in embodiments below. A microstructure of selected embodiments of dielectric layers 230 is discussed in detail in the following Figures.

Figure 3:
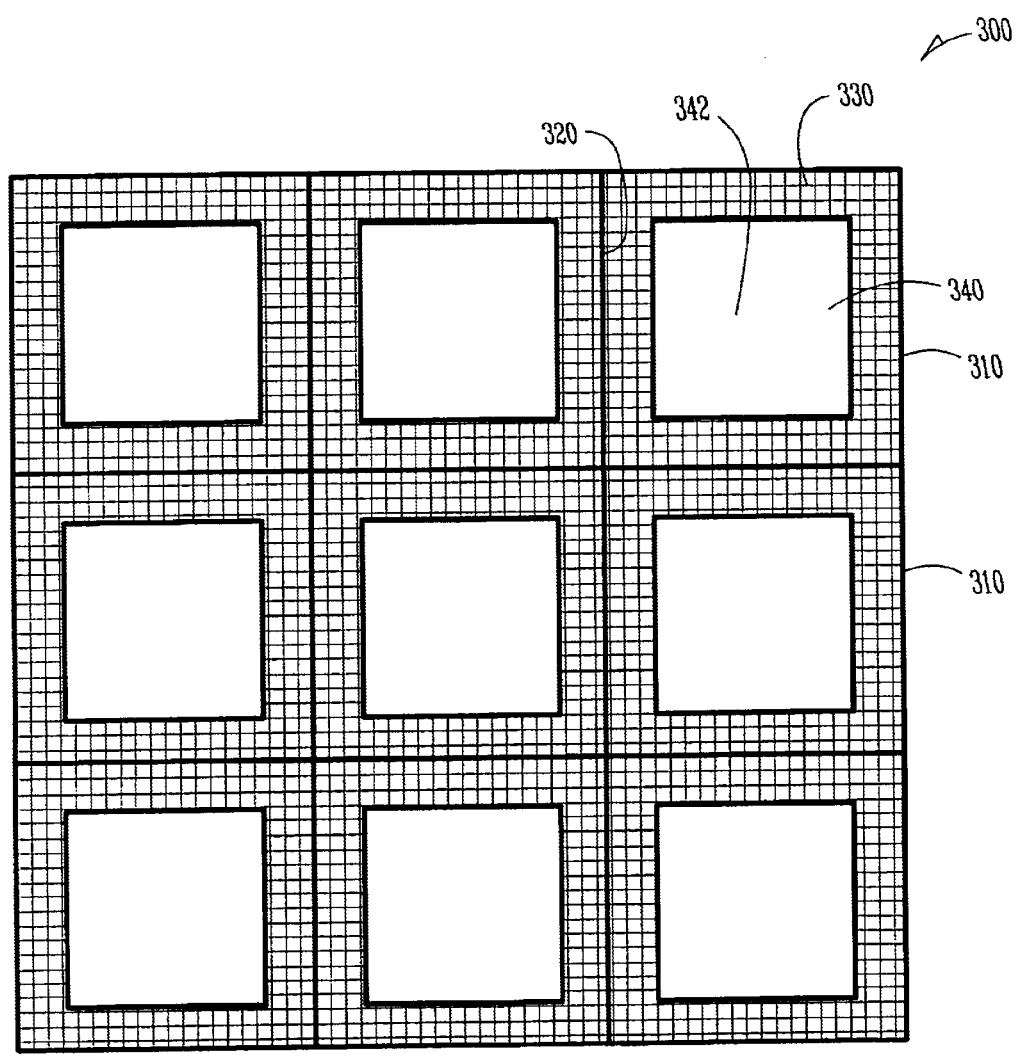
FIG. 3 is a schematic diagram of a number of dielectric grains according to one embodiment of the invention.

FIG. 3 shows a dielectric portion 300 including a number of grains 310. The dielectric portion 300 in FIG. 3 is intended to be a schematic representation, with square grains 310 used for illustration purposes. Likewise subsequent FIGS. 4 and 5 use square grains as an illustration. One of ordinary skill in the art, having the benefit of the present disclosure will recognize that grain shapes will typically be irregular. The dielectric portion 300 shown is further intended to show a portion of a dielectric layer with a limited number of grains for illustration. Dielectric layers in use can include much larger numbers of grains. While FIG. 3 shows grains 310 with a uniform size for illustration, the invention is not so limited. In one embodiment a distribution of grain sizes is included in the dielectric portion 300.

In one embodiment, dielectric grains 310 include ceramic grains, although other dielectric materials are also possible within the scope of the invention. In one embodiment, dielectric grains 310 include barium titanate ($BaTiO_3$) grains 310. Other ceramic grains aside from barium titanate grains are also acceptable.

Further shown in FIG. 3 are a number of grain boundaries 320. While the grain boundaries 320 are shown in the Figure as continuous interfaces, the invention is not so limited. In one embodiment, a certain degree of bonding or fusing at grain boundary interfaces is present as a result of dielectric processing such as sintering or flowing, etc. A percentage of continuous grain boundary interfaces is therefore present in selected embodiments. In one embodiment, a certain degree of porosity will be present in a final product. With porosity, a number of grain boundaries 320 will have gaps in their interfaces.

Further shown in FIG. 3 are a number of doping regions 330. In one embodiment, the doping regions 330 include a doping gradient having a higher concentration of dopant species near the grain boundaries 320 than towards the centers 342 of grain cores 340. In another embodiment, a doping concentration is constant versus depth in the doping region 330. Actual gradient profiles will depend on doping processing conditions, and gradient profiles are chosen based on desired electrical properties of the final dielectric portion 300.

In one method, dielectric grains 310 are doped by introducing the dopant species to the grains and providing a driving force to promote movement of the dopant species from the surface of the grains 310 towards the centers 342 of the grain core 340. In one embodiment a dopant species is mixed with the grains 310 prior to a bonding process such as sintering. In one embodiment an elevated temperature is then used to drive the dopant species into the grain, thus creating a dopant profile. In one embodiment, the dopant species is diffused into the grain 310, however other processes are also acceptable.

In one embodiment, a shell is defined as the region of the grain near the grain boundaries 320. In one embodiment, the doping regions 330 are in the shell portion of the grains 310. In one embodiment, the dopant species in the doping region 330 includes donor dopant species. In one embodiment, the donor dopant species includes atomic impurities. Possible donor species include, but are not limited to, lanthanum, actinium, niobium, and tantalum. In one embodiment, the dopant species modify dielectric properties of the grains 310 over their base material. In one embodiment, the dopant species modifies a function of dielectric constant versus temperature of the base material to provide a function with a wide band of high dielectric constant versus temperature. This allows an end product capacitor to perform well over a larger range of temperature.

In one embodiment, in addition to the dopant species, a modifier species is further added to the shell portion of the grains 310. In one embodiment, the modifier species promotes formation of a glassy phase at the grain boundaries 320. In one embodiment, a glassy phase is desirable because it enhances liquid phase sintering and lowers sintering temperatures.

Figure 4:
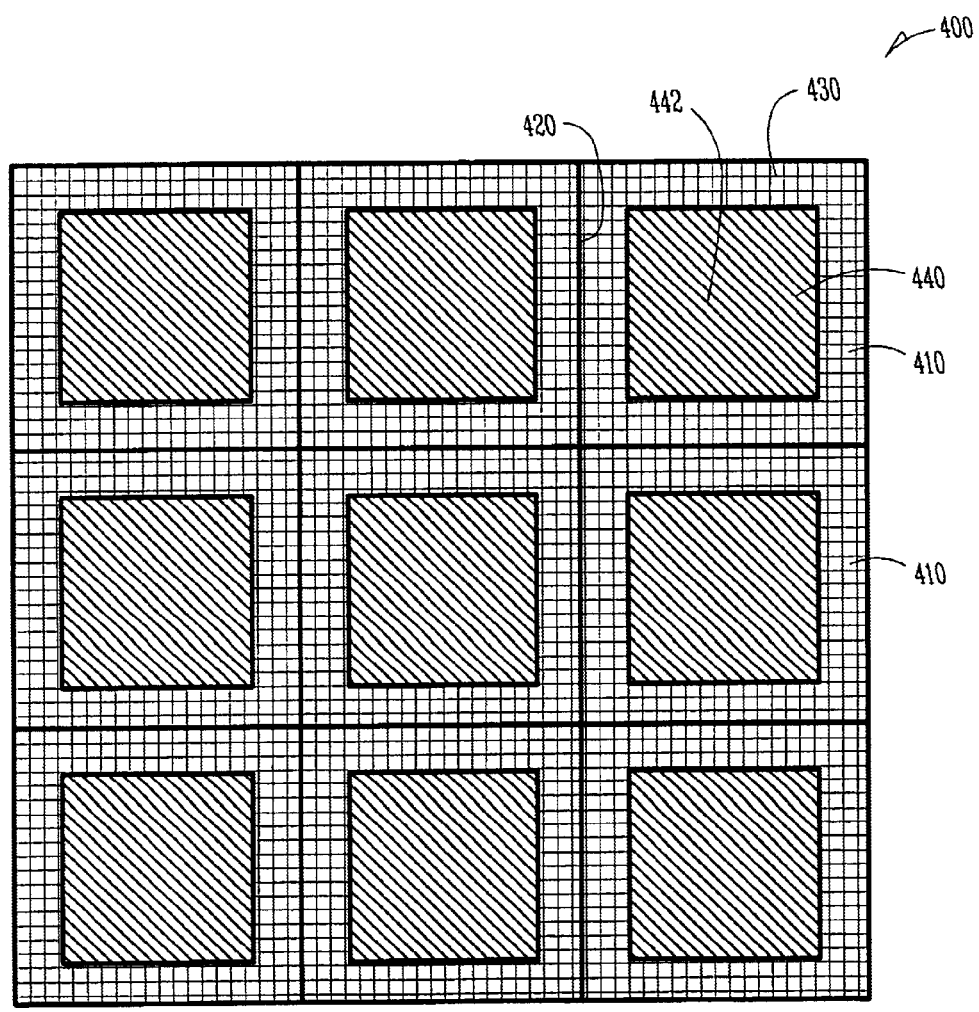
FIG. 4 is another schematic diagram of a number of dielectric grains according to one embodiment of the invention.

FIG. 4 shows a dielectric portion 400 including a number of grains 410. The dielectric portion 400 in FIG. 4 is intended to be a schematic representation, with square grains 410 used for illustration purposes. One of ordinary skill in the art, having the benefit of the present disclosure will recognize that grain shapes will typically be irregular. The dielectric portion 400 shown is further intended to show a portion of a dielectric layer with a limited number of grains for illustration. Dielectric layers in use can include much larger numbers of grains. While FIG. 4 shows grains 410 with a uniform size for illustration, the invention is not so limited. In one embodiment a distribution of grain sizes is included in the dielectric portion 400.

In one embodiment, dielectric grains 410 include ceramic grains, although other dielectric materials are also possible within the scope of the invention. In one embodiment, dielectric grains 410 include barium titanate ($BaTiO_3$) grains 410. Other ceramic grains aside from barium titanate grains are also acceptable.

Further shown in FIG. 4 are a number of grain boundaries 420 similar to the grain boundaries described in embodiments above. Further shown in FIG. 4 are a number of doping regions 430. In one embodiment, the doping regions 430 include a doping gradient having a higher concentration of dopant species near the grain boundaries 420 than towards the centers 442 of grain cores 440. In another embodiment, a doping concentration is constant versus depth in the doping region 430. Actual gradient profiles will depend on doping processing conditions, and gradient profiles are chosen based on desired electrical properties of the final dielectric portion 400. In one embodiment, dopant species are introduced to the doping region 430 using methods similar to those described above.

Similar to embodiments above, in one embodiment, a shell is defined as the region of the grain near the grain boundaries 420. In one embodiment, the doping regions 430 are in the shell portion of the grains 410. In one embodiment, the dopant species in the doping region 430 includes donor dopant species. In one embodiment, the donor dopant species includes atomic impurities. Possible donor species include, but are not limited to, lanthanum, actinium, niobium, and tantalum.

In selected embodiments, as illustrate in FIG. 4, the cores 440 of the grains 410 include a dopant species. In one embodiment, the cores 440 include an acceptor type dopant. In one embodiment, the acceptor dopant species includes atomic impurities. Possible acceptor species include, but are not limited to, iron, calcium, scandium, neodymium, nickel, magnesium, and gadolinium. In one embodiment, the doped cores 440 include a doping concentration that is constant versus depth in the doped cores 440. In other embodiments, a doping gradient is used, having a higher concentration of dopant species near the grain boundaries 420 than towards the centers 442 of grain cores 440. Actual core doping profiles will depend on doping processing conditions, and gradient profiles are chosen based on desired electrical properties of the final dielectric portion 400.

In one embodiment, the cores 440 are doped by introducing a dopant species to the grains 410 at the shell and diffusing the dopant into the core 440. In one embodiment, a dopants species is mixed in during formation of grains 410 and is thus evenly distributed through the grains 410.

In one embodiment, the acceptor species provide a level of electrical conductivity within the cores of the grain that can be controlled depending on the concentration of the core dopant species. In one embodiment, controlled electrical conductivity due to addition of dopant species provides a dampening effect that reduces unwanted oscillations in electrical device operation. Using dielectric configurations such as those described in FIG. 4, a damping effect will be recognized due to the addition of doped cores 440. The damping is a result of lossy electrical behavior of the dielectric portion 400. Currently a need in the industry for a lossy capacitor is not recognized. Capacitors are typically designed to minimize loss, however a non-lossy capacitor does not remove unwanted oscillations.

Although the doped cores 440 provide a desired lossy effect that can be controlled by an amount of doping, the grains 410 are not electrically leaky. In one embodiment, due to the doped shell region 430, any moving charge in the doped cores 440 is contained within the grain 410 and is therefore not leaked.

Figure 5:
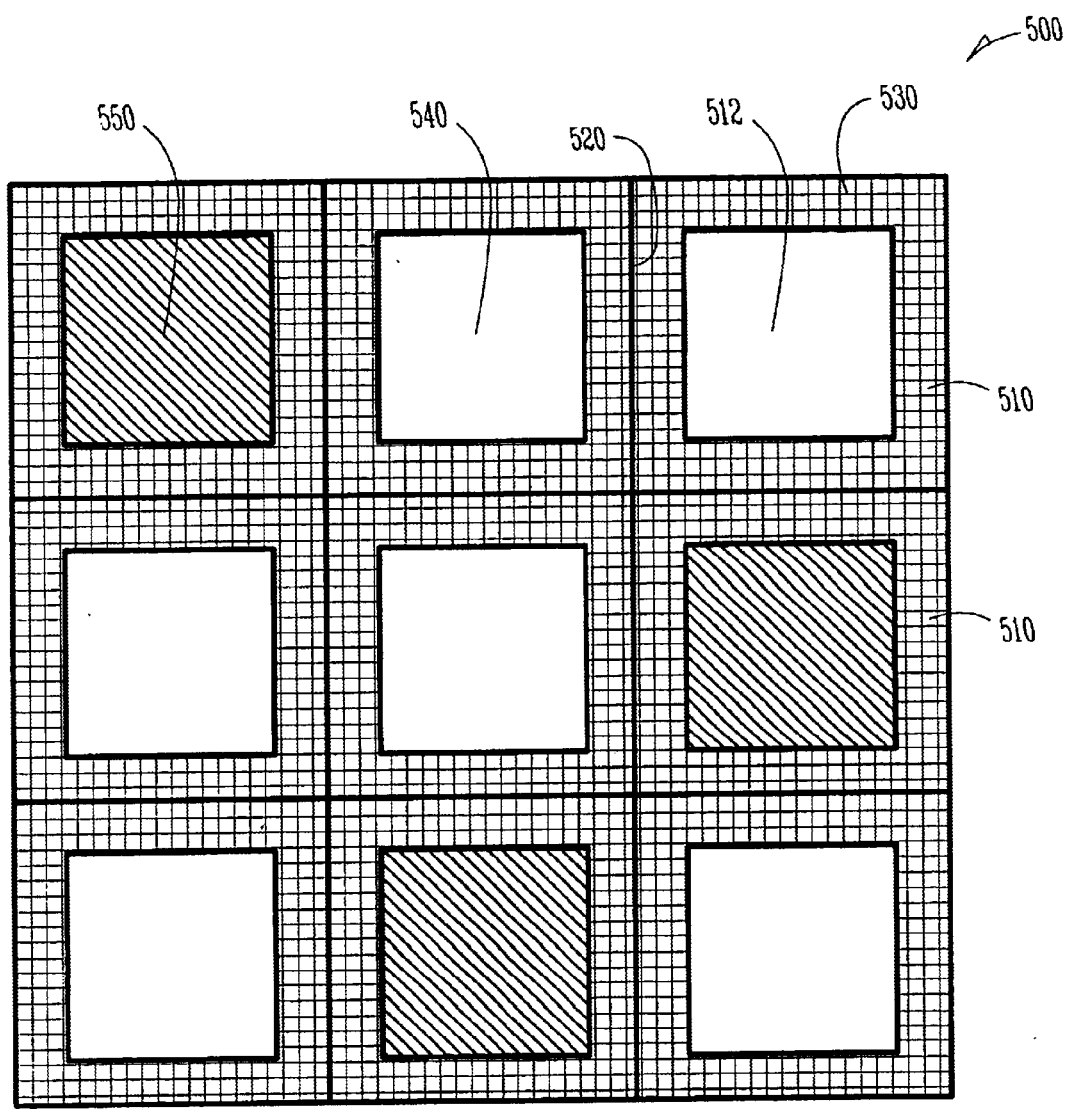
FIG. 5 is another schematic diagram of a number of dielectric grains according to one embodiment of the invention.

FIG. 5 shows a dielectric portion 500 including a number of grains 510. The dielectric portion 500 in FIG. 5 is intended to be a schematic representation, with square grains 510 used for illustration purposes. One of ordinary skill in the art, having the benefit of the present disclosure will recognize that grain shapes will typically be irregular. The dielectric portion 500 shown is further intended to show a portion of a dielectric layer with a limited number of grains for illustration. Dielectric layers in use can include much larger numbers of grains. While FIG. 5 shows grains 510 with a uniform size for illustration, the invention is not so limited. In one embodiment a distribution of grain sizes is included in the dielectric portion 500.

In one embodiment, dielectric grains 510 include ceramic grains, although other dielectric materials are also possible within the scope of the invention. In one embodiment, dielectric grains 510 include barium titanate ($BaTiO_3$) grains 510. Other ceramic grains aside from barium titanate grains are also acceptable.

Further shown in FIG. 5 are a number of grain boundaries 520 similar to the grain boundaries described in embodiments above. Further shown in FIG. 5 are a number of doping regions 530. In one embodiment, the doping regions 530 include a doping gradient having a higher concentration of dopant species near the grain boundaries 520 than towards the centers 512 of grains 510. In another embodiment, a doping concentration is constant versus depth in the doping region 530. Actual gradient profiles will depend on doping processing conditions, and gradient profiles are chosen based on desired electrical properties of the final dielectric portion 500. In one embodiment, dopant species are introduced to the doping region 530 using methods similar to those described above.

Similar to embodiments above, in one embodiment, a shell is defined as the region of the grain near the grain boundaries 520. In one embodiment, the doping regions 530 are in the shell portion of the grains 510. In one embodiment, the dopant species in the doping region 530 includes donor dopant species. In one embodiment, the donor dopant species includes atomic impurities. Possible donor species include, but are not limited to, lanthanum, actinium, niobium, and tantalum.

FIG. 5 further illustrates a number of grains 510 that include a mixture of undoped cores 540 and a number of doped cores 550. In one embodiment, the grains 510 having a doped core 550 will provide a lossy effect as described above. In one embodiment, the undoped cores 540 will provide a further design variable to tune an amount of lossy behavior in the dielectric portion 500. For example, in one embodiment, if a lower amount of lossy behavior is desired, an amount of dopant in the doped cores 550 can be lowered, and a fraction of doped core grains compared to undoped core grains can be reduced.

In addition, in one embodiment, the undoped cores 540 provide a further resistance to leaky behavior in the dielectric portion 500. In one embodiment, resistance to leaky behavior is provided by the doped shell region 530. Additional resistance to leaky behavior is provided by the presence of undoped cores 540 that are present in some fraction adjacent to doped core 550 grains, or substantially surrounding doped core 550 grains.

Figure 6:
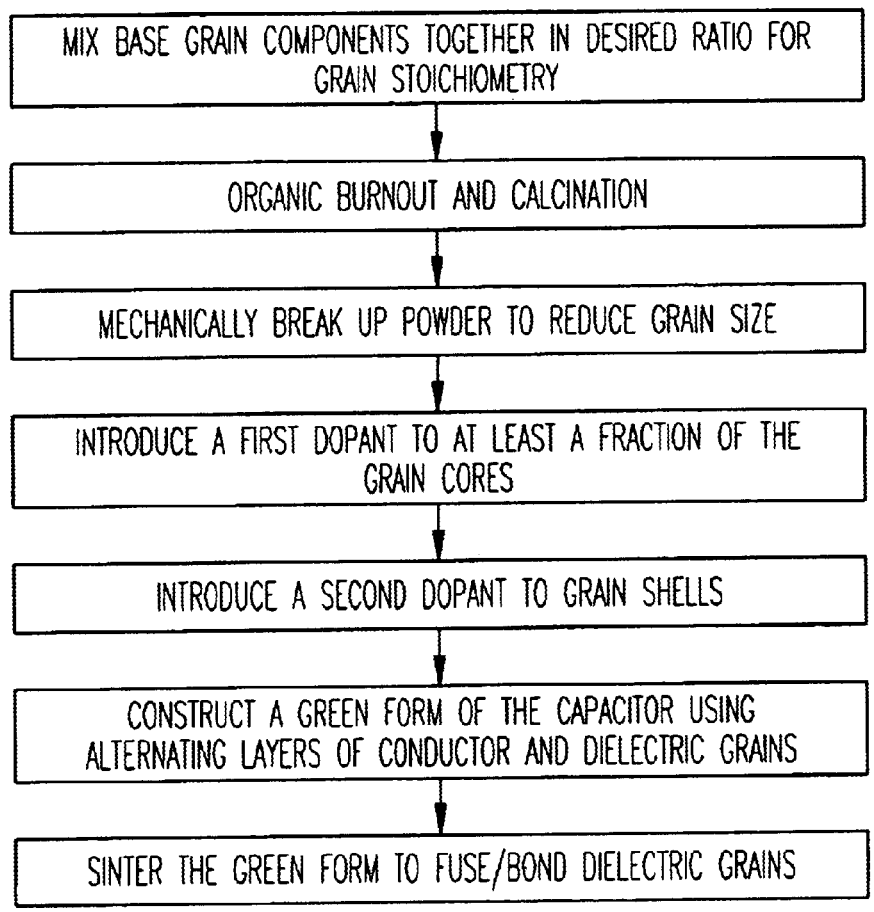
FIG. 6 illustrates a method of forming a capacitor according to an embodiment of the invention.

FIG. 6 illustrates one method of forming a dielectric material according to embodiments described above. The grain components are mixed in their desired stoichiometry. For example, powder particles are initially formed by mixing the ingredient precursor compounds, usually binary oxides or carbonates, in the right ratio.

In one embodiment, this is followed by an organic burnout step and a calcination step (heat treatment in an oxygen-rich atmosphere), where the organic solvents/constituents are burned out and the final compound is formed in the shape of powder particles. The chemistry of the ceramic powder is such that there are no intentional dopants. This powder forms the ferroelectric phase (for $BaTiO_3$-based ceramics) and is the source of the large dielectric constant of the capacitor made from these powders.

In one embodiment, this is followed by a mechanical break up of the powders to reduce their grain size. For example, the powders are ball-milled to decrease powder sizes and break up agglomerations formed during the calcination step.

In one embodiment, this is followed by doping operations. Shell regions and selected core regions are doped according to methods described above. For example, dopant solutions are added to the powders and a driving force is provided to place the dopant species in the core, or in the shell as desired. There may be subsequent calcination steps for different dopant species, where the dopant ions diffuse into the grain interior through the powder surface. The dopants eventually create a concentration profile.

In one embodiment, a green form (non-bonded or unsintered) device such as a capacitor is built-up by depositing alternating layers of ceramic powders (mixed with organic binders, which are later burned-out) and metal (Ni, Pt, Ag/Pd) paste. The green device parts are sintered in order for the powders to fuse/bond into each other to form the ceramic and metal layers. Outer contact terminals are formed and the device is tested, etc.

Devices and methods described above have a number of advantages. One advantage includes a lossy dielectric capacitor that is also not leaky. The lossy behavior dampens unwanted oscillations in power supplies or other electrical systems. Another advantage includes a dielectric design for a device such as a capacitor that is tunable for an amount of lossy behavior over a broad range. A core dopant concentration can be varied, and a doped core grain fraction can be varied to produce a desired lossy property in a capacitor. Designs such as a doped shell reduce leakiness. Additionally in selected embodiments, undoped core grains mixed with doped core grains reduce leakiness. While a number of advantages of embodiments of the invention are described, the above list is not intended to be exhaustive.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of embodiments described above. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A capacitor, comprising:
    a first plate;
    a second plate;
    a number of dielectric grains between the first plate and the second plate wherein at least a portion of the grains include:
        an outer shell that is doped with a first dopant species; and
        an inner core that is doped with a second dopant species.

2. The capacitor of claim 1, further including a number of intermediate plates between the first plate and the second plate, the intermediate plates being separated from the first and second plate by layers of the number of dielectric grains.

3. The capacitor of claim 1, wherein the first dopant species includes a donor dopant species.

4. The capacitor of claim 1, wherein the first dopant species includes a species chosen from the group consisting of lanthanum, actinium, niobium, and tantalum.

5. The capacitor of claim 1, wherein the second dopant species includes an acceptor dopant species.

6. The capacitor of claim 1, wherein the second dopant species includes a species chosen from the group consisting of iron, calcium, scandium, neodymium, nickel, magnesium, and gadolinium.

7. The capacitor of claim 1, wherein the dielectric grains include ceramic grains.

8. The capacitor of claim 7, wherein the ceramic grains include barium titanate ($BaTiO_3$).

9. A capacitor, comprising:
    a first plate;
    a second plate;
    a mixture of dielectric grains between the first plate and the second plate, including:
        a first number of dielectric grains wherein at least a portion of the first number of dielectric grains include:
            an outer shell that is doped with a first dopant species;
            an inner core that is doped with a second dopant species; and
        a second number of dielectric grains having an outer shell that is doped with a third dopant species and an undoped core.

10. The capacitor of claim 9, further including a number of intermediate plates between the first plate and the second plate, the intermediate plates being separated from the first and second plate by layers of the mixture of dielectric grains.

11. The capacitor of claim 9, wherein the first dopant species is the same as the third dopant species.

12. The capacitor of claim 9, wherein the first dopant species includes a donor dopant species.

13. The capacitor of claim 9, wherein the second dopant species includes an acceptor dopant species.

14. A capacitor, comprising:
    a plurality of conducting plates;
    a number of dielectric grains separating the plurality of plates wherein at least a portion of the grains include:
        an outer shell that is doped with a first dopant species; and
        an inner core that is doped with a second dopant species.

15. The capacitor of claim 14, wherein the first dopant species includes a donor species.

16. The capacitor of claim 14, wherein the second dopant species includes an acceptor species.

17. The capacitor of claim 14, wherein the wherein at least a portion of the number of dielectric grains include undoped cores.

18. An information handling system, comprising:
    a number of circuits, including:
        a processor circuit;
        a dynamic random access memory circuit;
        a bus coupled between the processor circuit and the dynamic random access memory circuit;
    a power delivery system coupled to the number of circuits;
    a capacitor coupled between the power delivery system and the number of circuits, including;
        a first plate;
        a second plate;
        a number of dielectric grains between the first plate and the second plate wherein at least a portion of the grains include:
            an outer shell that is doped with a first dopant species; and
            an inner core that is doped with a second dopant species.

19. The information handling system of claim 18, wherein the dynamic random access memory circuit includes a rambus dynamic random access memory circuit.

20. The information handling system of claim 18, wherein the first dopant species includes a donor dopant species.

21. The information handling system of claim 18, wherein the second dopant species includes an acceptor dopant species.

22. A method of forming a capacitor, comprising:

forming a number of dielectric grains;

doping at least a portion of the dielectric grain cores with a first dopant species;

doping at least a portion of the outer shells of the dielectric grains with a second dopant species;

bonding the dielectric grains to form a dielectric layer;

coupling a first conducting plate on a first side of the dielectric layer; and coupling a second conducting plate on a second side of the dielectric layer.

23. The method of claim 22, wherein bonding the dielectric grains includes sintering the dielectric grains.

24. The method of claim 22, wherein doping at least a portion of the dielectric grain cores with a first dopant species includes doping at least a portion of the dielectric grain cores with a donor dopant species.

25. The method of claim 22, wherein doping at least a portion of the outer shells of the dielectric grains with a second dopant species includes doping at least a portion of the outer shells of the dielectric grains with an acceptor dopant species.

26. The method of claim 22, further including selecting a fraction of doped core grains and a fraction of undoped core grains to adjust a lossiness property in the capacitor.

27. The method of claim 22, further including coupling a number of layers of alternating conducting plates and dielectric layers to the second conducting plate.

* * * * *

UNITED STATES PATENT AND TRADEMARK OFFICE
CERTIFICATE OF CORRECTION

PATENT NO. : 6,795,296 B1
DATED : September 21, 2004
INVENTOR(S) : Palanduz et al.

It is certified that error appears in the above-identified patent and that said Letters Patent is hereby corrected as shown below:

<u>Column 8,</u>
Line 45, delete "wherein the" before "wherein".
Line 58, after "including" delete ";" and insert -- : --, therefor.

Signed and Sealed this

First Day of February, 2005

JON W. DUDAS
*Director of the United States Patent and Trademark Office*